(12) United States Patent
Taylor

(10) Patent No.: US 6,708,474 B2
(45) Date of Patent: Mar. 23, 2004

(54) SINGLE PASS TOBACCO HARVESTER AND METHOD

(76) Inventor: Ron Taylor, P.O. Box 518, Elizabethtown, NC (US) 28337

( * ) Notice: Subject to any disclaimer, the term of this patent is extended or adjusted under 35 U.S.C. 154(b) by 0 days.

(21) Appl. No.: 10/006,662

(22) Filed: Dec. 10, 2001

(65) Prior Publication Data

US 2003/0106298 A1 Jun. 12, 2003

(51) Int. Cl.[7] ................................................ A01D 45/16
(52) U.S. Cl. ...................................................... 56/27.5
(58) Field of Search ........................ 56/27.5, 330, 218, 56/219; 131/290, 313; 414/26

(56) References Cited

U.S. PATENT DOCUMENTS

| 2,816,411 | A | * | 12/1957 | Wilson ........................ 56/27.5 |
| 3,507,103 | A | * | 4/1970 | Picket et al. ................. 56/27.5 |
| 3,731,475 | A | * | 5/1973 | Balthes ........................ 56/27.5 |
| 3,754,387 | A | * | 8/1973 | Chapman ..................... 56/27.5 |
| 3,841,068 | A | * | 10/1974 | Rakestraw ....................... 56/1 |
| 3,962,850 | A | | 6/1976 | Moore |
| 4,282,888 | A | | 8/1981 | Pinkham |
| 4,285,189 | A | * | 8/1981 | Mikhailov et al. ............ 56/27.5 |
| 4,378,669 | A | * | 4/1983 | Prince .......................... 56/27.5 |
| 4,476,669 | A | | 10/1984 | Wilson |
| 4,773,434 | A | | 9/1988 | Miyaki et al. |
| 4,836,220 | A | | 6/1989 | Miyaki et al. |
| 6,014,853 | A | * | 1/2000 | Gregory et al. ............... 56/27.5 |
| 6,185,921 | B1 | | 2/2001 | Taylor |

* cited by examiner

Primary Examiner—Árpád Fábián Kovács
(74) Attorney, Agent, or Firm—Duane Morris LLP

(57) ABSTRACT

An tobacco harvester which on a single pass through the field sorts tobacco leaves as the leaves are harvested based on the height at which they grow on the tobacco stalk. An adjustable guide directs leaves as they are stripped from the stalk onto upper and lower conveyor belts which transport the leaves into separate collection bins.

12 Claims, 4 Drawing Sheets

SINGLE PASS TOBACCO HARVESTER AND METHOD

BACKGROUND OF THE INVENTION

The present invention relates to the harvesting of flue cured tobacco and, more specifically, to a tobacco harvester which separates the upper leaves from the lower leaves in a single pass of the harvester through the field. This harvester is an improvement over the harvester disclosed in U.S. Pat. No. 6,185,921, issued Feb. 13, 2001 and assigned to the assignee hereof, the disclosure of which patent is incorporated herein by reference.

Tobacco harvesting methods have changed in recent years. Previously, tobacco leaves were harvested progressively as they ripened from the bottom of the plant upward over the course of the ripening season. The harvesting was accomplished on a series of passes through the field to select only the leaves that were ripe, initially a manual harvesting with the leaf selection accomplished visually, and more recently mechanically with the leaf selection accomplished by an adjustment of the height at which the leaves were stripped form the stalk.

The simultaneous mechanical harvest of most if not all of the tobacco leaves is now favored because of the cost of labor, the development of tobacco plants whose leaves ripen during a narrower time span and the availability of chemical ripeners. If the leaves are harvested in one pass through the field, the leaves thereafter must be sorted by quality, generally a function of the location of the leaf on the stalk.

Burley tobacco is harvested by cutting the entire stalk and curing the leaves by air drying while attached to the stalk. It is know to sort the leaves of cured burley tobacco as they are stripped from the stalk and such a tobacco leaf-stripping device is disclosed, for example, in U.S. Pat. No. 4,282,888 dated Aug. 11, 1981, U.S. Pat. No. 4,773,434 dated Sep. 27, 1988, and U.S. Pat. No. 4,836,220 dated Jun. 6, 1989. Such devices are not adaptable for the harvesting of flue cured tobacco in the field, nor are they adapted for use with uncured tobacco leaves.

Accordingly, it is an object of the present invention to provide a novel tobacco harvester and method for selectively removing in a single pass through the field leaves from two different areas on the tobacco stalk as a function of the height at which they grow in the stalk.

These and many other objects and advantages of the present invention will be readily apparent to one skilled in the art to which the invention pertains from a perusal of the claims, the appended drawings, and the following detailed description of the preferred embodiments.

DESCRIPTION OF A PREFERRED EMBODIMENT

Figure 1:
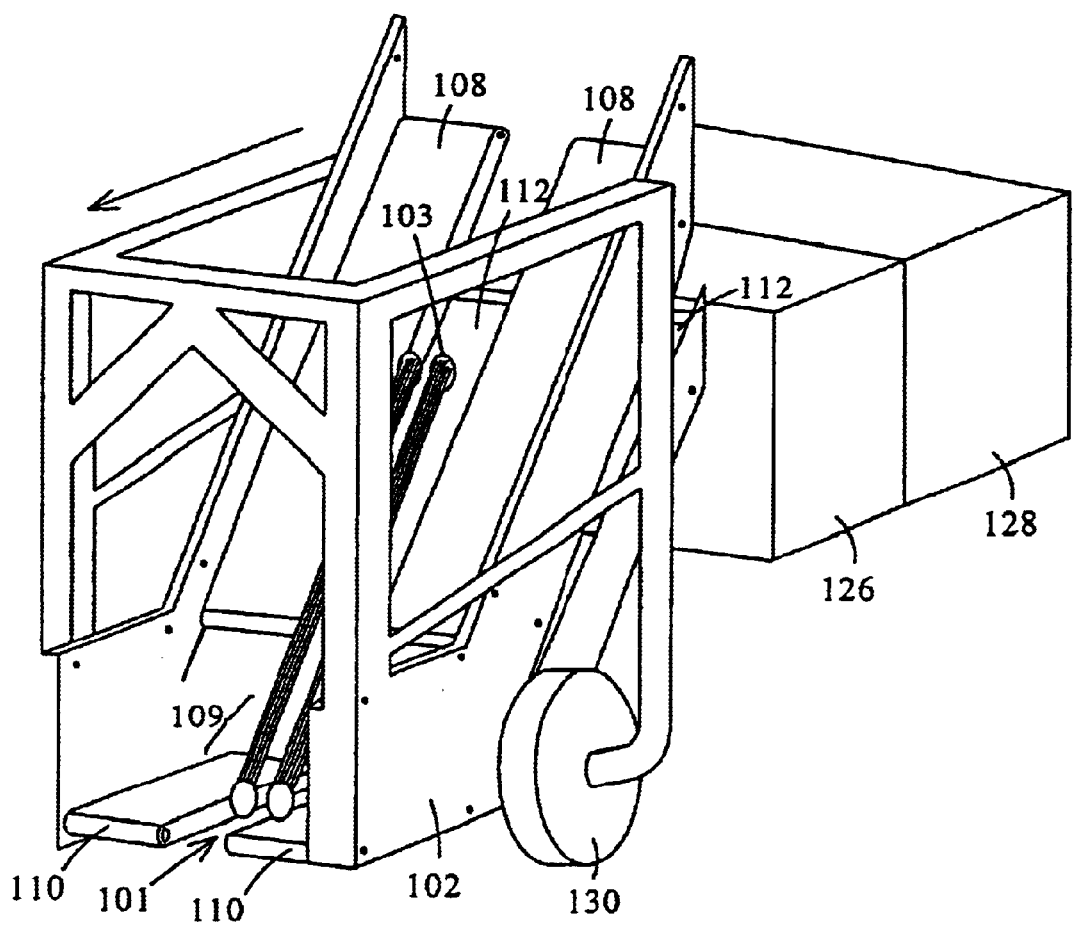
FIG. 1 is a pictorial representation of a portion of the tobacco harvester of the present invention viewed from a front quadrant with the guides removed to show the bins, the conveyor belts, the defoliator and the frame.
Figure 2:
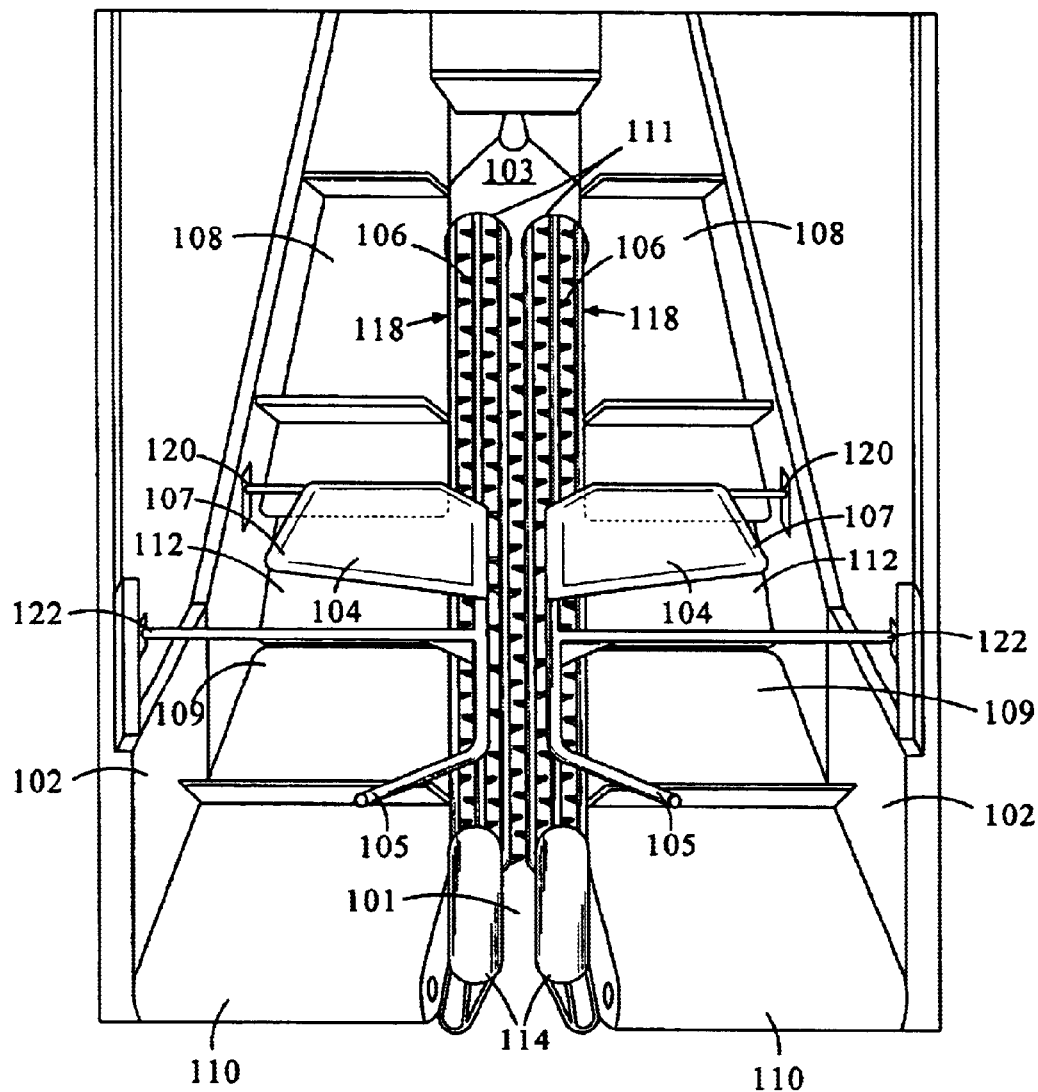
FIG. 2 is a pictorial representation of a portion of the tobacco harvester of FIG. 1 from the front showing the guides and conveyors.
Figure 3:
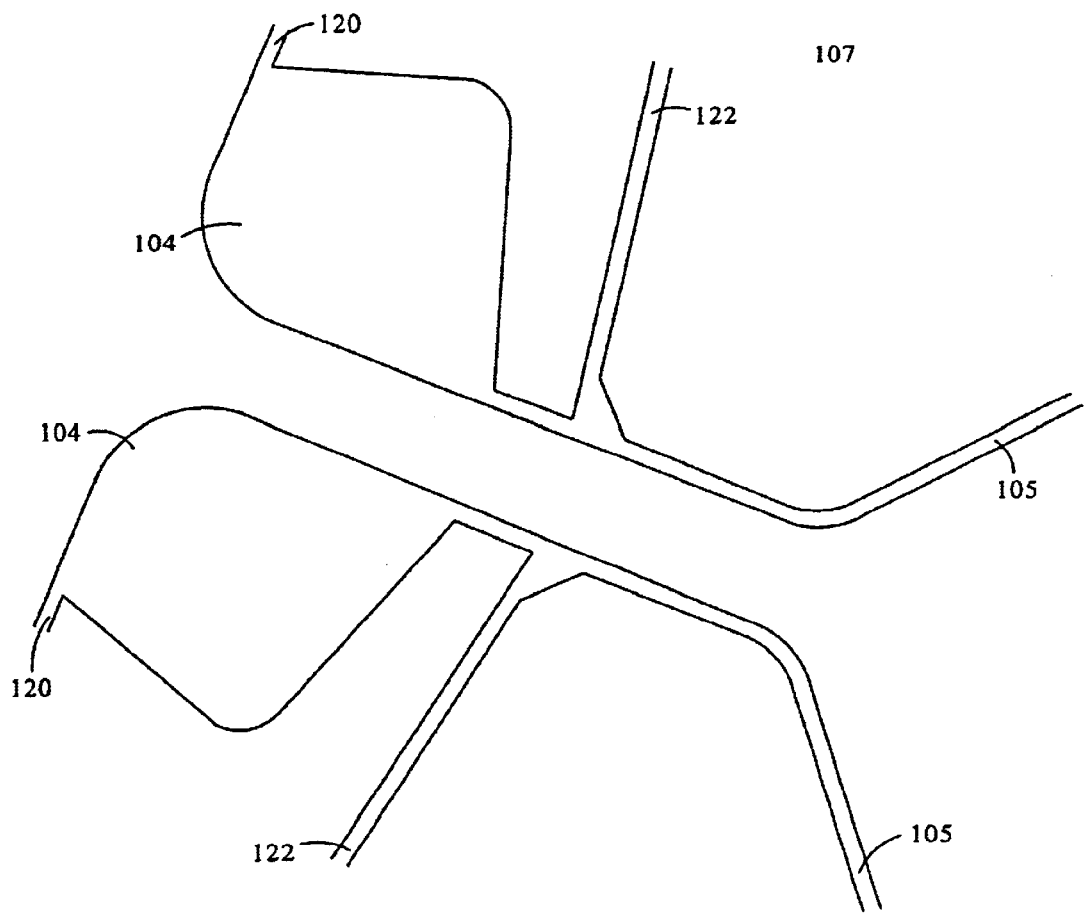
FIG. 3 is a top plan view of the guides shown in FIG. 2.

An exemplary embodiment of the tobacco harvester of the present invention is shown in FIGS. 1, 2 and 3.

With reference to the Figures where like numerical designations have been used for like elements to facilitate an understanding of the invention, the components of the tobacco harvester are generally carried by a frame 102 having two or more wheels 130 to facilitate the movement thereof through the field. The frame 102 can be trailed behind a tractor or may alternatively be provided with its own motive power.

The frame 102 has a longitudinal passageway 101 which accommodates the passage of a row of tobacco stalks through the frame. Tobacco stalks of a single row enter the frame 102 and travel through the longitudinal passageway 101 as the frame 102 is moved along that row. The riding height of the frame 102 in relation to the ground can be adjusted by hydraulic pistons or other suitable conventional means.

The frame 102 carries the conveyor belts 108, 109. Each of the conveyor belts 108, 109 has at least one drive roller or sprocket to drive the belting. The belting can be made of any suitable material and is desirably provided with ridges or cleats to improve the conveyance of the leaves without damaging them.

The lower pair of conveyor belts 109 is carried by the frame 102, one each on opposite lateral sides of the longitudinal passageway 101. Each belt consists of a generally horizontal section 110 and an angled section 112 extending upwardly and rearwardly of the frame. The horizontal section 110 of the lower pair of conveyor belts 109 extends forwardly at least to the same extent as, and desirably further forward than the defoliator 103. The horizontal section 110 may be adjusted to a position generally close to the ground at approximately at the height of the lowest leaves that are to be harvested to carry the defoliated leaves rearwardly to the angled section 112, which in turn carries the leaves rearwardly and upwardly to a bin 126, 128 in FIG. 4.

The upper pair of conveyor belts 108 is carried by the frame 102, one each on opposite lateral sides of the longitudinal passageway 101. The upper pair of conveyor belts extends upwardly and rearwardly from an adjustable height on the defoliator 103. The horizontal section 110 of the lower pair of conveyor belts 109 extends further forward than the forward end of the upper pair of conveyor belts 108.

As described in more detail in applicant's U.S. Pat. No. 6,185,921, the defoliator 103 is angled such that it contacts the lower leaves first as the tobacco harvester travels along a row of tobacco plants. The vertical span of the defoliator 103 is desirably sufficient to defoliate an entire tobacco plant in one pass. The defoliator 103 may be of any suitable conventional type and may, for example, include a pair of rotary shafts 111 with attached cutter bars 106, disposed one each on opposite lateral sides of and adjacent to the longitudinal passageway 101. The rotary shafts 111 desirably rotate upwardly in the center of the passageway, i.e. opposite directions to one another, in the defoliating motion such they help to throw the defoliated leaves onto the conveyor belts 108, 109 on each lateral side of the longitudinal passageway 101.

The frame 102 may carry two separate bins 126, 128 for collecting the harvested leaves in fixed positions adjacent the ends of the conveyor belts. Alternatively, the bins may be trailed or dragged by the frame 102. The elevation of the bins permits them to pass over the defoliated stalks, but the conveyors may discharge the leaves laterally into bins positioned laterally of the stalks.

As shown in FIG. 2, each of the pair of rotary shafts 111 of the defoliator 103 is desirably provided with a nose cone 114 adapted to lift up the lower leaves in position to be contacted by the defoliator 103 and are not passed over.

As shown in FIG. 2 and FIG. 3, an exemplary embodiment of the guides 107 may be fixed to the frame by support rods 120, 122. By varying the height of rear pair of support rods 120 in relation to the front pair of support rods 122, the angle of the guides 107 can be varied. Also the height of the support rods 120, 122 can be adjusted together to vary the overall height of the guides 107 and thus the dividing line on the stalk between upper and lower leaves.

The bars 105 of the guides 107 serves to guide the stalks into the longitudinal passageway as the frame 102 moves through the field. The forwardly extending shafts 105 have an opening substantially wider than the longitudinal passageway 102 to funnel any tobacco stalk within their lateral reach into the longitudinal passageway 101. This allows the harvester to accommodate minor variations in the direction of the frame's travel and/or in the placement of an individual tobacco stalks in relation to the row. The guides 107 are provided with flat surfaces 104 or pans to lift the leaves passing thereover and thus present a generally horizontal leaf stem to the defoliator.

Figure 4:
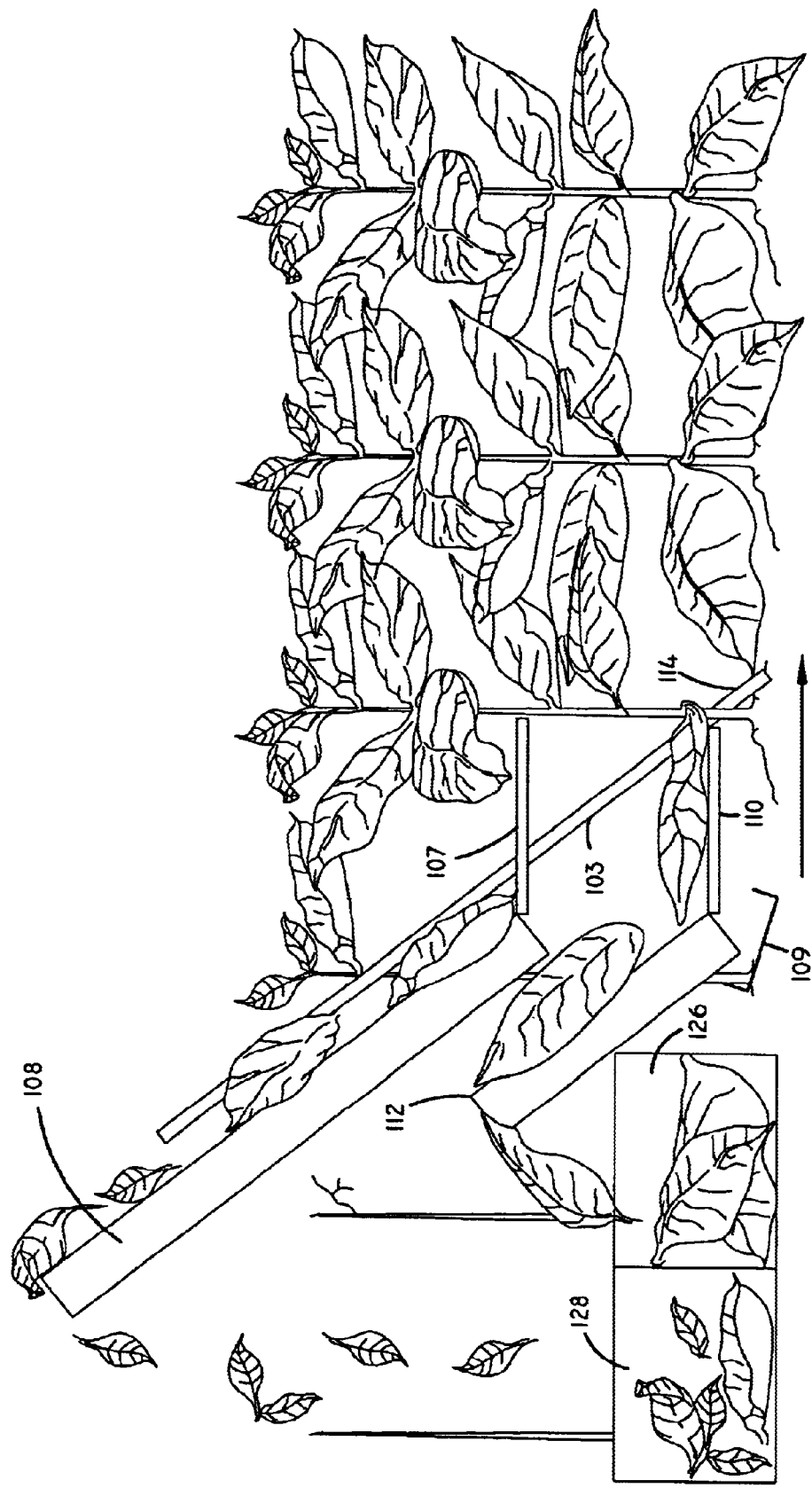
FIG. 4 is a schematic representation of the tobacco harvester of the present invention that illustrating the operation thereof.

The operation of the harvester is schematically illustrated in FIG. 4. As the harvester travels along a row of tobacco plants, it harvests upwardly from the bottom of the stalk. As the lower leaves up to the level of the guides 107, including those lifted by the nose cones 114 are stripped from the tobacco stalks, they fall onto the horizontal section 110 of the lower pair of conveyor belts 109 and are conveyed to the angled section 112 of the lower conveyor 109. These leaves are then conveyed upwardly and rearwardly, and then dropped into the first collection bin 126.

As the harvester advances, the flat surfaces 104 of the guides 107 contact some of the drooping upper leaves, pushing them up towards the upper portion 118 of the defoliator 103. The flat surfaces 104 of the guides 107 can be angled slightly downwardly and forwardly to aid this process. When the upper leaves are removed form the stalk, they fall or are thrown onto the upper pair of conveyor belts 108 or onto the guides 107 from which they are conveyed by the upper pair of conveyor belts 108 to the bin 128. The guides 107 serve an additional purpose of ensuring that the defoliated upper leaves do not fall onto the lower conveyor belts 109.

As shown in FIG. 4, the leaves are segregated or sorted by their height. All of the upper leaves are carried to the second bin 128 and the lower leaves carried to the first bin 126. The height of the guide 107 can be varied to move the boundary between upper and lower leaves. Alternatively, the frame 102 can be raised or lowered, or the position of the conveyor belts 108, 109 within the frame 102 can be adjusted in tandem or in relation to each other.

Of course the present invention can be implemented in dual row harvesters to simultaneously harvest two rows. The addition of other guides and conveyor systems permits the sorting of the harvested leaves into more than two bins.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A tobacco harvester for segregating a group of upper leaves from a group of lower leaves of tobacco plants as the leaves are harvested comprising:
    a frame adapted to be moved forwardly in rolling contact with the ground with a longitudinal passageway for the passage of tobacco plants therethrough;
    an upper pair of conveyor belts carried by said frame one each on opposite lateral sides of the passageway;
    a lower pair of conveyor belts carried by said frame one each on opposite lateral sides of the passageway, said lower pair of conveyor belts extending forwardly of said upper pair of conveyor belts;
    a first collection bin carried by said frame in position to receive tobacco leaves conveyed by said upper pair of conveyor belts;
    a second collection bin carried by said frame in position to receive tobacco leaves conveyed by said lower pair of conveyor belts;
    a defoliator for removing leaves from tobacco plants passing through the passageway in said frame progressively upwardly as the plants pass through the passageway in said frame, said defoliator being carried by said frame relative to said lower pair of conveyors so that leaves removed from the lower portion of the tobacco plant fall onto said lower pair of conveyors; and
    a pair of generally horizontal guide members carried one each on opposite lateral sides of the passageway in said frame for positioning the stalks of the tobacco plants relative to the defoliator as the stalks pass through the passageway, the upper surface of
    said guide members guiding leaves removed from the portion of the tobacco plants above said guide members onto said upper pair of conveyors,
    whereby the leaves removed from the lower portion of the tobacco plants are segregated from the leaves removed from the upper portion of the tobacco plants as the tobacco plants pass through the passageway in said frame and are defoliated by said defoliator.

2. A tobacco harvester for segregating a group of upper leaves from a group of lower leaves of tobacco plants as the leaves are harvested comprising:
    a frame adapted to be moved forwardly in contact with the ground with a longitudinal passageway for the passage of tobacco plants therethrough;
    an upper pair of conveyor belts carried by said frame one each on opposite sides of the passageway;
    a lower pair of conveyor belts carried by said frame one each on opposite lateral sides of the passageway;
    a first collection bin carried by said frame in position to receive tobacco leaves conveyed by said upper pair of conveyor belts;
    a second collection bin carried by said frame in position to receive tobacco leaves conveyed by said lower pair of conveyor belts;
    a defoliator for removing leaves from tobacco plants passing through the passageway in said frame, said defoliator being carried by said frame relative to said pairs of conveyors so that leaves removed from the lower portion of the tobacco plant fall
    onto said lower pair of conveyors and leaves removed from the upper portion of said defoliator onto said upper pair of conveyors,
    whereby the leaves removed from the lower portion of the tobacco plants are segregated from the leaves removed from the upper portion of the tobacco plants as the tobacco plants pass through the passageway in said frame and are defoliated by said defoliator.

3. The tobacco harvester of claim 2 including a pair of guides carried one each on opposite lateral sides of the passageway in said frame extending into the passageway for guiding leaves removed from the upper portion of said defoliator onto said pair of upper conveyors.

4. The tobacco harvester of claim 3 wherein the height of said guides is adjustable.

5. The tobacco harvester of claim 3 wherein the portion of said guides extending into the passageway also positions the stalks of the tobacco plants relative to the defoliator as the plants pass through the passageway.

6. The tobacco harvester of claim 2 wherein said defoliator includes on both lateral sides of the passageway a rotary shaft with cutter bars, said shafts being forwardly and downwardly inclined to contact the leaves of the plant progressively upwardly as the plants pass through the passageway in said frame; and wherein said lower pair of conveyor belts extends forwardly of said upper pair of conveyor belts.

7. The tobacco harvester of claim 2 wherein each of said conveyor belts extends rearwardly and upwardly relative to said frame.

8. In a mechanical tobacco harvester adapted to be moved along a row of tobacco plants to effect the substantial defoliation thereof in a single pass, the improvement comprising means for selectively segregating the leaves removed from the upper portion of the plants from the leaves removed from the lower portion of the plants as the harvester makes the pass.

9. In a mechanical tobacco harvester adapted to be moved forwardly along a row of tobacco plants for removing leaves progressively upwardly therefrom and having a conveyor system for collecting the removed leaves, the improvement wherein different portions of the conveyor system differ in forward extension to exclusively receive leaves removed from different heights on the tobacco plants.

10. In a mechanical tobacco harvester adapted to be moved forwardly along a row of tobacco plants for removing leaves therefrom and having a conveyor system for collecting the removed leaves, the improvement comprising plural conveyors at different heights to exclusively receive leaves removed from different heights on the tobacco plants.

11. In a method of mechanically harvesting leaves from a row of tobacco plants during the single pass of a harvester along the row of plants, the improvement comprising the segregation of the tobacco leaves as they are removed from the stalks of the tobacco plants as a function of the position of the leaves on the stalks of the tobacco plants.

12. The method of claim 11 wherein the segregation of leaves is a function of the height of the leaves on the stalks of the tobacco plants.

* * * * *